United States Patent
Kitamura et al.

(10) Patent No.: US 9,751,408 B2
(45) Date of Patent: Sep. 5, 2017

(54) MOTOR DRIVING UNIT

(71) Applicant: KABUSHIKI KAISHA TOYOTA JIDOSHOKKI, Kariya-shi, Aichi (JP)

(72) Inventors: Keisuke Kitamura, Kariya (JP); Yoshinori Shimizu, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/173,787

(22) Filed: Jun. 6, 2016

(65) Prior Publication Data
US 2017/0001523 A1 Jan. 5, 2017

(30) Foreign Application Priority Data
Jul. 3, 2015 (JP) .................. 2015-134408

(51) Int. Cl.
*H02P 1/00* (2006.01)
*B60L 3/00* (2006.01)
*H02P 27/06* (2006.01)
*B60L 11/18* (2006.01)
*H02P 29/024* (2016.01)

(52) U.S. Cl.
CPC .......... *B60L 3/003* (2013.01); *B60L 11/1803* (2013.01); *H02P 27/06* (2013.01); *H02P 29/0241* (2016.02)

(58) Field of Classification Search
CPC ....... H02P 27/06; H02P 1/029; H02P 29/0241
See application file for complete search history.

(56) References Cited

U.S. PATENT DOCUMENTS 9,236,825 B2 * 1/2016 Kawati .................... B60L 7/14

FOREIGN PATENT DOCUMENTS

| JP | 2000-32603 A | 1/2000 |
| JP | 2000-333468 A | 11/2000 |

* cited by examiner

*Primary Examiner* — Karen Masih
(74) *Attorney, Agent, or Firm* — Sughrue Mion, PLLC

(57) ABSTRACT

A motor driving unit (1) includes a controller (15) that performs driving control of a motor (3) by controlling an inverter (11). During regeneration of the motor (3), the controller (15) performs output stopping control for causing the inverter (11) to stop an output, when an inter-terminal voltage of a capacitor (12) is equal to or greater than a first threshold value. The controller (15) performs output restarting control for causing the inverter (11) to restart the output, when the inter-terminal voltage of the capacitor (12) is equal to or smaller than a second threshold value which is smaller than the first threshold value. The controller (15) performs regenerative braking by allowing the output stopping control and the output restarting control to be repeatedly performed.

5 Claims, 5 Drawing Sheets

MOTOR DRIVING UNIT

TECHNICAL FIELD

The present invention relates to a motor driving unit which drives a vehicle driving motor.

BACKGROUND

A motor for driving a vehicle and a motor driving unit for driving the motor are mounted on a so-called automobile, an electric vehicle such as a battery forklift, and a hybrid vehicle. The motor driving unit includes a three-phase inverter which converts DC power from a battery into three-phase AC power and supplies the three-phase AC power to a three-phase motor, and a controller which performs driving control of the motor by controlling the inverter. The controller performs the driving control of the motor, based on a motor command rotation frequency (command rotation speed) received from a main controller in a vehicle and a motor actual rotation frequency (actual rotation speed) received from a rotation sensor of the motor. Japanese Unexamined Patent Publication No. 2000-333468 and Japanese Unexamined Patent Publication No. 2000-32603 disclose this type of motor driving unit.

In addition, Japanese Unexamined Patent Publication No. 2000-333468 discloses that switching elements of an entire arm are disconnected all at once in order to protect the switching elements (overvoltage protection) in an inverter from abnormal overvoltage of a DC power supply voltage which is likely to occur during regenerative braking of a motor in an electric vehicle or a hybrid vehicle.

In addition, Japanese Unexamined Patent Publication No. 2000-32603 discloses that a circuit element is protected in a chopper circuit for traveling in the following way. In an electric motor car such as a battery forklift, a battery is disconnected during regenerative braking of a motor for traveling. In a case where an overvoltage is generated in the chopper circuit for traveling due to regenerative energy generated in the motor for traveling, the chopper circuit for traveling is stopped, and power is supplied to a chopper circuit for cargo handling. In this manner, the regenerative energy generated in the motor for traveling is consumed by the motor for cargo handling so as to suppress an overvoltage.

However, if all of the switching elements of the inverter are disconnected during regeneration of the motor, that is, if an output of the inverter is stopped, a regenerative braking force cannot be obtained.

Therefore, the present invention aims to provide a motor driving unit which can compatibly protect an overvoltage of a circuit element and maintain a regenerative braking force, even if an overvoltage state occurs in a DC voltage on an input side of an inverter during regeneration of a motor.

SUMMARY

According to an aspect of the present invention, there is provided a motor driving unit for driving a vehicle driving motor by using a battery as a power source. The motor driving unit includes an inverter that converts DC power supplied from the battery into AC power, and that supplies the AC power to the motor, a controller that performs driving control of the motor by controlling the inverter, based on a rotation frequency of the motor, a capacitor that is connected in parallel to an input side of the inverter, and a voltage sensor that detects an inter-terminal voltage of the capacitor. During regeneration of the motor, the controller performs output stopping control for causing the inverter to stop an output of the AC power, when the inter-terminal voltage of the capacitor which is detected by the voltage sensor is equal to or greater than a first threshold value. The controller performs output restarting control for causing the inverter to restart the output of the AC power, when the inter-terminal voltage of the capacitor which is detected by the voltage sensor is equal to or smaller than a second threshold value which is smaller than the first threshold value. The controller performs regenerative braking by allowing the output stopping control and the output restarting control to be repeatedly performed.

According to the motor driving unit, during the regeneration of the motor, the controller performs the output stopping control for causing the inverter to stop the output, when the inter-terminal voltage of the capacitor is equal to or greater than the first threshold value. The controller performs the output restarting control for causing the inverter to restart the output, when the inter-terminal voltage of the capacitor is equal to or smaller than the second threshold value which is smaller than the first threshold value. The controller allows the output stopping control and the output restarting control to be repeatedly performed. Accordingly, even if an overvoltage state of the inter-terminal voltage of the capacitor, that is, an overvoltage state of a DC voltage on the input side of the inverter occurs during the regeneration of the motor, the controller can cause the inverter to continue the output, and can obtain a regenerative braking force of the motor. In addition, the inverter itself can protect an overvoltage of its circuit element by repeatedly performing the output stopping control. Therefore, the motor driving unit itself, particularly the inverter itself can compatibly protect the overvoltage of its circuit element and maintain the regenerative braking force of the motor.

Incidentally, at the time of a load dump state, in a case where the overvoltage state occurs in the DC voltage on the input side of the inverter, it is required to prohibit the output of the inverter. The load dump state means a state where the battery and the motor driving unit are disconnected from each other. For example, the load dump state occurs in a case where a cable for connecting the battery and the motor driving unit to each other is broken down.

In this regard, the present inventor paid attention to the following facts. During normal regeneration, when the output stopping control is performed, that is, after the inverter stops the output, the inter-terminal voltage of the capacitor decreases relatively steeply, and a variation amount in the inter-terminal voltage (differential value of a voltage) of the capacitor is relatively great on a negative side. In contrast, during load dump, when the output stopping control is performed, that is, after the inverter stops the output, the inter-terminal voltage of the capacitor decreases gradually, and the variation amount in the inter-terminal voltage of the capacitor is small on the negative side.

Therefore, the above-described controller may increase a count when the variation amount of the inter-terminal voltage of the capacitor does not fall below the third threshold value during the output stopping control. The controller may continuously perform the output stopping control, and may not allow the output restarting control, when the count reaches a predetermined value.

According to this configuration, at the time of the load dump state, in a case where the overvoltage state occurs in the DC voltage on the input side of the inverter, it is possible to prohibit the output of the inverter.

On the other hand, when the variation amount of the inter-terminal voltage of the capacitor falls below the third threshold value during the output stopping control, the above-described controller may not increase the count, and may allow the output stopping control and the output restarting control to be repeatedly performed.

According to this configuration, during the normal regeneration except for the load dump state, in a case where the overvoltage state occurs in the DC voltage on the input side of the inverter, the controller can cause the inverter to continue the output, and can obtain the regenerative braking force of the motor.

In addition, the above-described controller may reduce the output of the AC power of the inverter during the output restarting control.

According to this configuration, regeneration can be gradually reduced by gradually reducing the output of the inverter. Therefore, the overvoltage state in the DC voltage on the input side of the inverter can be settled relatively fast.

DETAILED DESCRIPTION

Figure 1:
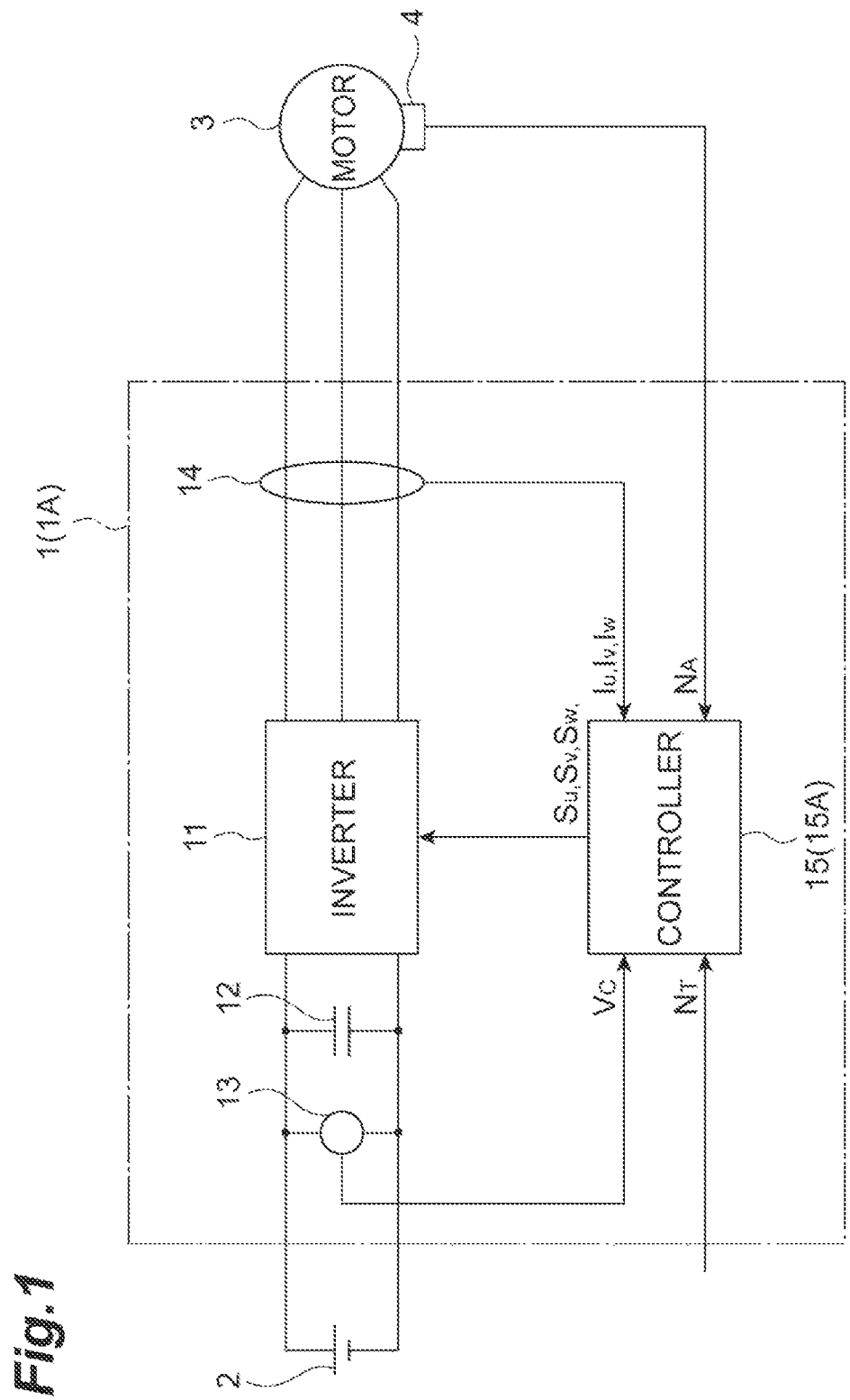
FIG. 1 illustrates a configuration of a motor driving unit according to first and second embodiments of the present invention.

Hereinafter, preferred embodiments according to the present invention will be described in detail with reference to the drawings. The same reference numerals will be given to the same or equivalent elements in each drawing.

First Embodiment

Figure 2:
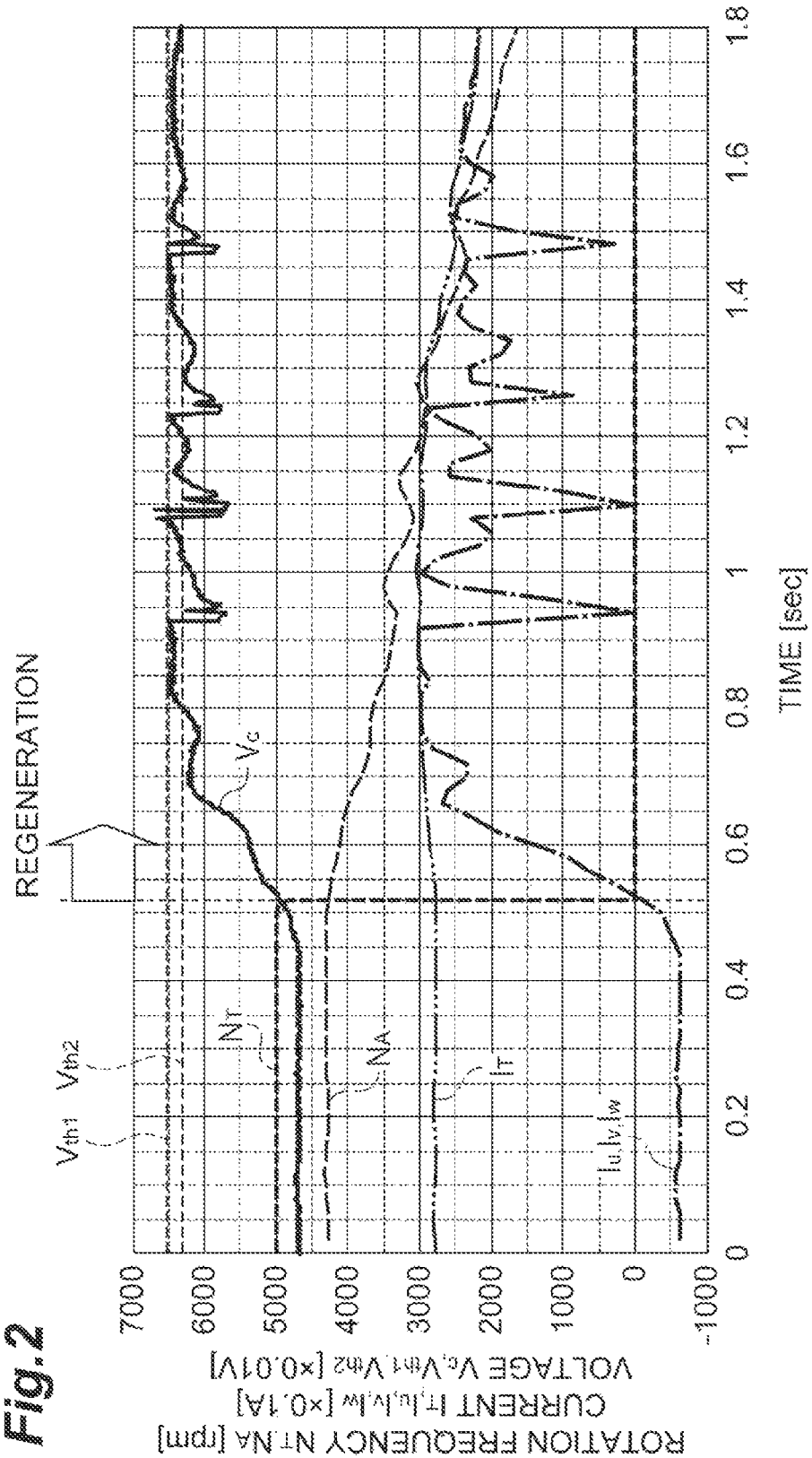
FIG. 2 illustrates a waveform of each section in the motor driving unit according to the first embodiment.

FIG. 1 illustrates a configuration of a motor driving unit according to a first embodiment of the present invention. FIG. 2 illustrates a waveform of each section in the motor driving unit according to the first embodiment. A motor driving unit 1 illustrated in FIG. 1 drives a vehicle driving motor in a so-called automobile, an electric vehicle such as a battery forklift, or a hybrid vehicle. The motor driving unit 1 converts DC power supplied from a battery 2 into three-phase AC power, and drives a three-phase motor 3 by using the three-phase AC power. The motor driving unit 1 includes an inverter 11, a capacitor 12, a voltage sensor 13, a current sensor 14, and a controller 15.

The inverter 11 is a three-phase inverter configured to include six switching elements, converts the DC power supplied from the battery 2 into the three-phase AC power, and supplies the three-phase AC power to the motor 3. A rotation sensor 4 is attached to the motor 3. The rotation sensor 4 detects an actual rotation frequency (actual rotation speed) $N_A$ of the motor 3, and transmits the detection result to the controller 15.

The capacitor 12 and the voltage sensor 13 are connected in parallel to an input side of the inverter 11. The voltage sensor 13 detects an inter-terminal voltage $V_c$ of the capacitor 12, and transmits the detection result to the controller 15.

In other words, the voltage sensor 13 detects a DC voltage on the input side of the inverter 11, and transmits the detection result to the controller 15.

In addition, the current sensor 14 is arranged on an output side of the inverter 11. The current sensor 14 detects actual currents $I_u$, $I_v$, and $I_w$ in each phase of the motor 3, and transmits the detection result to the controller 15.

Based on a command rotation frequency (command rotation speed) $N_T$ and the actual rotation frequency (actual rotation speed) $N_A$ transmitted from the rotation sensor 4 of the motor 3, the controller 15 generates a current command (torque current) IT. Based on the current command IT and the actual currents (torque currents) $I_u$, $I_v$, and $I_w$, the controller 15 generates respective phase control signals $S_u$, $S_v$, and $S_w$ for driving the respective phase switching elements in the inverter 11. For example, the command rotation frequency (command rotation speed) $N_T$ is the maximum rotation frequency which is supplied from a main controller (not illustrated) in a vehicle and which corresponds to 100% of the output from the motor 3. In this manner, the controller 15 performs driving control of the motor 3 by performing feedback control of the inverter 11.

In addition, the controller 15 identifies regeneration of the motor 3, based on the command rotation frequency $N_T$ or the actual currents $I_u$, $I_v$, and $I_w$. Specifically, as illustrated in FIG. 2, the controller 15 identifies the regeneration of the motor 3, in a case where the command rotation frequency $N_T$ becomes zero, or in a case where the actual currents $I_u$, $I_v$, and $I_w$ have the reversed polarity (direction). FIG. 2 illustrates the actual currents $I_u$, $I_v$, and $I_w$ which flow from the motor 3 toward the inverter 11.

Then, during the regeneration of the motor 3, when the inter-terminal voltage $V_c$ of the capacitor 12 is equal to or greater than an overvoltage detection threshold value (first threshold value) $V_{th1}$, the controller 15 determines that the DC voltage on the input side of the inverter 11 is in an overvoltage state, and causes the inverter 11 to stop outputting the AC power (output stopping control). Specifically, the controller 15 causes the inverter 11 to stop outputting the AC power by causing the six switching elements to stop a switching operation.

In addition, during the regeneration of the motor 3, when the inter-terminal voltage $V_c$ of the capacitor 12 is equal to or smaller than an overvoltage recovery threshold value (second threshold value) $V_{th2}$ ($V_{th2}<V_{th1}$), the controller 15 determines that the DC voltage on the input side of the inverter 11 is recovered from the overvoltage state, and causes the inverter 11 to restart outputting the AC power (output restarting control). Specifically, the controller 15 causes the inverter 11 to restart outputting the AC power by causing the six switching elements to restart the switching operation.

In addition, during the regeneration of the motor 3, the controller 15 allows the above-described output stopping control and output restarting control to be intermittently and repeatedly performed. During the regeneration of the motor 3, if the DC voltage on the input side of the inverter 11 is brought into the overvoltage state in this way, the inverter 11 repeatedly stops and recovers the output at a short interval as illustrated in FIG. 2. The inverter 11 intermittently continues the output, and thus, the motor 3 can intermittently obtain a regenerative braking force.

If a difference is set to be small between the overvoltage detection threshold value $V_{th1}$ and the overvoltage recovery threshold value $V_{th2}$, the inverter 11 recovers the output early, thereby lengthening a regenerative braking period of the motor 3. On the other hand, If the difference is set to be great between the overvoltage detection threshold value $V_{th1}$ and the overvoltage recovery threshold value $V_{th2}$, the inverter 11 recovers the output late, thereby lengthening an overvoltage protection period.

Incidentally, at the time of the load dump state, in a case where the overvoltage state occurs in the DC voltage on the input side of the inverter 11, it is required to prohibit the inverter 11 from outputting the AC power. The load dump state means a state where the battery 2 and the motor driving unit 1 are disconnected from each other. For example, the load dump state occurs in a case where a cable for connecting the battery 2 and the motor driving unit 1 to each other is broken down.

Figure 3:
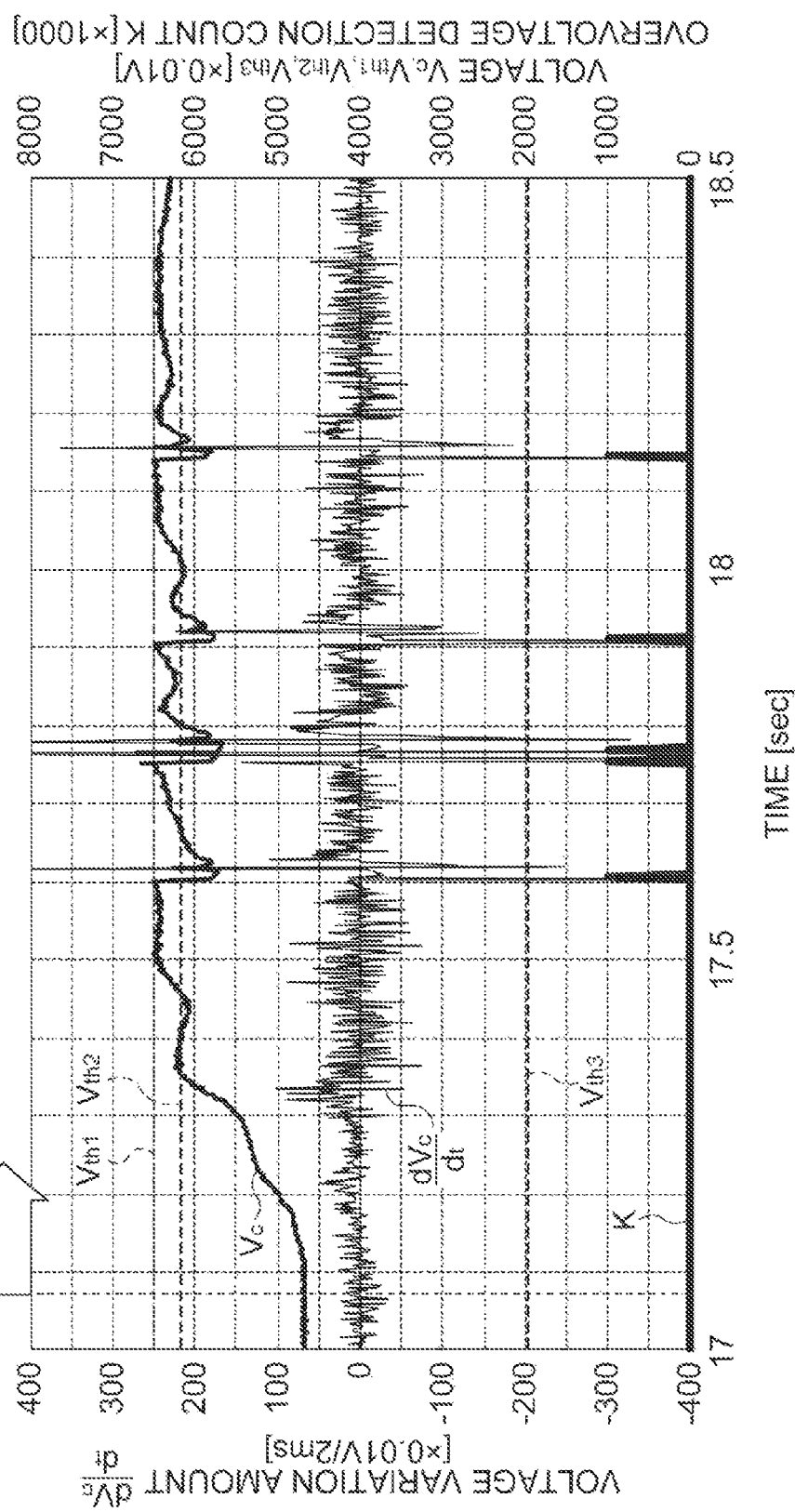
FIG. 3 illustrates an inter-terminal voltage and its variation amount in a capacitor during normal regeneration.

In this regard, the present inventor pays attention to the following fact. As illustrated in FIG. 3, during normal regeneration, when the output stopping control is performed, that is, after the inverter 11 stops the output, the inter-terminal voltage $V_c$ of the capacitor 12 decreases relatively steeply, and a variation amount $dV_c/d_t$ in the inter-terminal voltage of the capacitor 12 is relatively great on a negative side. In contrast, as illustrated in FIG. 4, during load dump, when the output stopping control is performed, that is, after the inverter 11 stops the output, the inter-terminal voltage $V_c$ of the capacitor 12 decreases gradually, and the variation amount $dV_c/d_t$ in the inter-terminal voltage of the capacitor 12 is small on the negative side.

Figure 4:
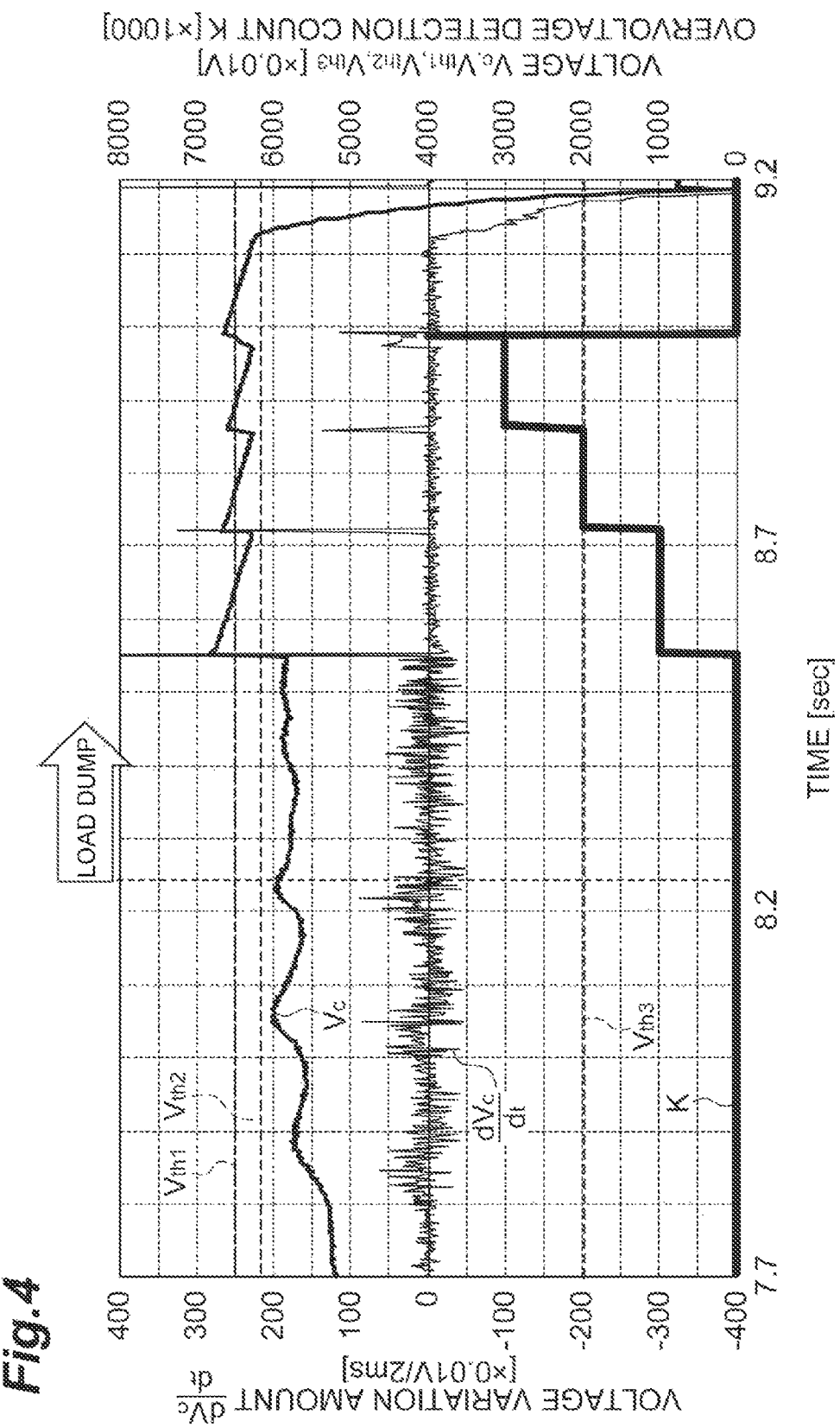
FIG. 4 illustrates the inter-terminal voltage and its variation amount in the capacitor during load dump.

Therefore, as illustrated in FIG. 4, during the output stopping control, when the variation amount $dV_c/d_t$ in the inter-terminal voltage of the capacitor 12 does not fall below a threshold value (third threshold value) $V_{th3}$, the controller 15 determines a load dump state, and increases an overvoltage detection count K whenever the inter-terminal voltage $V_c$ of the capacitor 12 exceeds the overvoltage detection threshold value $V_{th1}$. For example, the controller 15 monitors the variation amount $dV_c/d_t$ in the inter-terminal voltage of the capacitor 12 at every 2 ms. After the output restarting control is performed, the controller 15 increases the overvoltage detection count K when detecting the overvoltage state again within one second. Then, if the overvoltage detection count K reaches a predetermined value, for example, four times, the controller 15 continues to perform the output stopping control even during the regeneration, and does not allow the output restarting control. At the time of the load dump state, in a case where the overvoltage state occurs in the DC voltage on the input side of the inverter 11, the output of the inverter 11 can be prohibited in this way. For example, until a key switch of a vehicle is turned on for resetting, the controller 15 continues a state where the output of the inverter 11 is prohibited.

On the other hand, as illustrated in FIG. 3, during the output stopping control, when the variation amount $dV_c/d_t$ in the inter-terminal voltage of the capacitor 12 falls below the threshold value $V_{th3}$, the controller 15 determines a normal regeneration state, and does not increase the overvoltage detection count K. For example, the controller 15 may not increase the overvoltage detection count K by resetting the overvoltage detection count K whenever the controller 15 determines the normal regeneration state. During the normal regeneration except for the load dump state, in a case where the overvoltage state occurs in the DC voltage on the input side of the inverter 11, the controller 15 can cause the inverter 11 to intermittently continue the output in this way, and can intermittently obtain the regenerative braking force of the motor 3.

As described above, according to the motor driving unit 1 of the first embodiment, during the regeneration of the motor 3, when the inter-terminal voltage $V_c$ of the capacitor 12 increases so as to be equal to or greater than the overvoltage detection threshold value (first threshold value) $V_{th1}$, the controller 15 causes the inverter 11 to stop the output (output stopping control). When the inter-terminal voltage $V_c$ of the capacitor 12 decreases so as to be equal to or smaller than the overvoltage recovery threshold value (second threshold value) $V_{th2}$, the controller 15 causes the inverter 11 to restart the output (output restarting control) ($V_{th2} < V_{th1}$), and allows the output stopping control and the output restarting control to be repeatedly performed. Accordingly, during the regeneration of the motor 3, even if the overvoltage state in the inter-terminal voltage $V_c$ of the capacitor 12, that is, the overvoltage state in the DC voltage on the input side of the inverter 11 occurs, the controller 15 can cause the inverter 11 to intermittently continue the output, and can intermittently obtain the regenerative braking force of the motor 3. In addition, the inverter 11 itself can protect the overvoltage of its circuit element by repeatedly performing the output stopping control. Therefore, the motor driving unit 1 itself, particularly the inverter 11 itself can compatibly protect the overvoltage of its circuit element and maintain the regenerative braking force of the motor 3.

Second Embodiment

Figure 5:
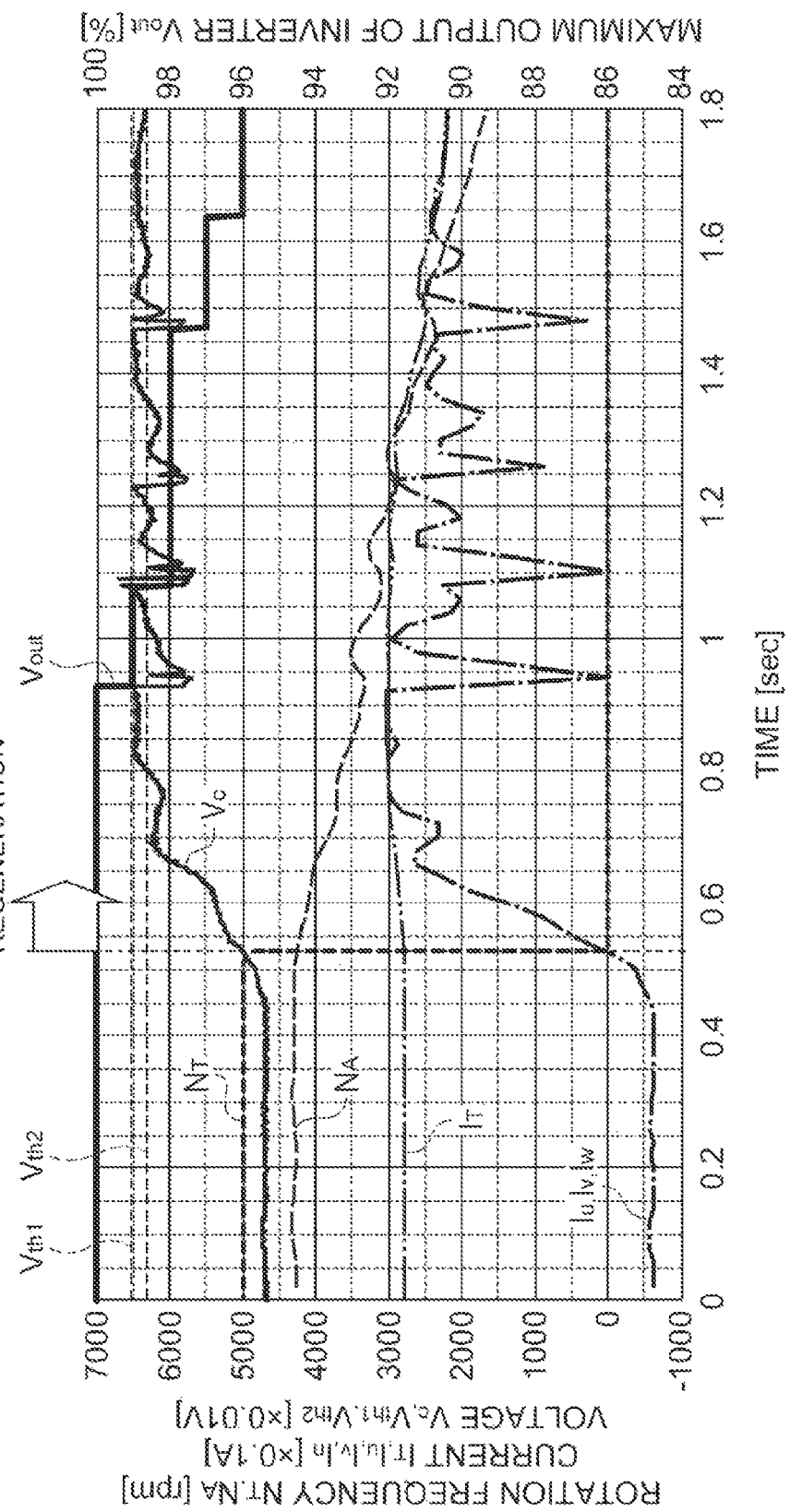
FIG. 5 illustrates a waveform of each section in the motor driving unit according to the second embodiment.

FIG. 1 illustrates a configuration of a motor driving unit according to a second embodiment of the present invention. FIG. 5 illustrates a waveform of each section in the motor driving unit according to the second embodiment. A motor driving unit 1A according to the second embodiment is different from the first embodiment in that a controller 15A is provided instead of the controller 15 in the motor driving unit 1. Other configurations of the motor driving unit 1A are the same as those of the motor driving unit 1.

The controller 15A has the same function as the controller 15. Furthermore, as illustrated in FIG. 5, whenever the controller 15A performs the output restarting control, the controller 15A reduces a current command (torque current) $I_T$ by each constant ratio, thereby reducing an output $V_{out}$ of the inverter 11 by each constant ratio. Specifically, the controller 15A decreases a limiting value of the maximum output of the inverter 11 which corresponds to 100% of the output from the motor 3, by each constant ratio. That is, the controller 15A decreases the output so as to quickly reach the limiting value. For example, at the timing when the generation is shifted to power running, the controller 15A no longer prohibits the inverter 11 from outputting the AC voltage.

The motor driving unit 1A according to the second embodiment can also obtain the same advantageous effect as the motor driving unit 1 according to the first embodiment.

Furthermore, according to the motor driving unit 1A of the second embodiment, the regeneration can be gradually reduced by gradually decreasing the output $V_{out}$ of the inverter 11. Therefore, the overvoltage state in the DC voltage on the input side of the inverter 11 can be settled relatively fast.

Without being limited to the above-described embodiments, the present invention can be modified in various ways. For example, the embodiments have been described as an example in which the load dump state and the normal regeneration state are identified so as to continue to perform the output stopping control at the time of the load dump state and the output restarting control is not allowed, that is, an example in which the inverter 11 is prohibited from outputting the AC voltage in a case where the overvoltage state occurs in the DC voltage on the input side of the inverter 11.

However, in a case where the load dump is not required, an embodiment may be adopted in which the output stopping control and the output restarting control are always allowed to be repeatedly performed during the regeneration without identifying the load dump state and the normal regeneration state.

In addition, the embodiments have been described as an example in which the inverter 11 is prohibited from outputting the AC voltage when the overvoltage detection count K reaches a predetermined value (for example, four or more) during the load dump. However, the predetermined value is not limited to four. For example, the predetermined value may be an integer of two or more.

In addition, the features of the present invention are applicable to not only an electromagnetic induction type motor but also an electric vehicle and a hybrid vehicle which include an electromagnet type motor.

What is claimed is:

1. A motor driving unit for driving a vehicle driving motor by using a battery as a power source, comprising:
   an inverter that converts DC power supplied from the battery into AC power, and that supplies the AC power to the motor;
   a controller that performs driving control of the motor by controlling the inverter, based on a rotation frequency of the motor;
   a capacitor that is connected in parallel to an input side of the inverter; and
   a voltage sensor that detects an inter-terminal voltage of the capacitor,
   wherein during regeneration of the motor, the controller performs output stopping control for causing the inverter to stop an output of the AC power, when the inter-terminal voltage of the capacitor which is detected by the voltage sensor is equal to or greater than a first threshold value,
   wherein the controller performs output restarting control for causing the inverter to restart the output of the AC power, when the inter-terminal voltage of the capacitor which is detected by the voltage sensor is equal to or smaller than a second threshold value which is smaller than the first threshold value, and
   wherein the controller performs regenerative braking by allowing the output stopping control and the output restarting control to be repeatedly performed.

2. The motor driving unit according to claim 1, wherein the controller performs the regenerative braking by allowing the output stopping control and the output restarting control to be repeatedly performed, when a variation amount of the inter-terminal voltage of the capacitor falls below a third threshold value during the output stopping control.

3. The motor driving unit according to claim 2, wherein the controller increases a count when the variation amount of the inter-terminal voltage of the capacitor does not fall below the third threshold value during the output stopping control, and
wherein the controller continuously performs the output stopping control, and does not allow the output restarting control, when the count reaches a predetermined value.

4. The motor driving unit according to claim 2, wherein the controller does not increase a count when the variation amount of the inter-terminal voltage of the capacitor falls below the third threshold value during the output stopping control.

5. The motor driving unit according to claim 1, wherein the controller reduces the output of the AC power of the inverter during the output restarting control.

* * * * *